(12) United States Patent
Menard et al.

(10) Patent No.: US 10,008,042 B2
(45) Date of Patent: Jun. 26, 2018

(54) AUGMENTED REALITY RENDERED STRUCTURED CONTENT

(71) Applicant: Intel Corporation, Santa Clara, CA (US)

(72) Inventors: Alexis Menard, Campina Grande (BR); Bryan G. Bernhart, Hillsboro, OR (US)

(73) Assignee: Intel Corporation, Santa Clara, CA (US)

(*) Notice: Subject to any disclaimer, the term of this patent is extended or adjusted under 35 U.S.C. 154(b) by 0 days. days.

(21) Appl. No.: 15/282,443

(22) Filed: Sep. 30, 2016

(65) Prior Publication Data
US 2018/0096529 A1 Apr. 5, 2018

(51) Int. Cl.
G06T 19/00 (2011.01)
G06T 19/20 (2011.01)
G06F 3/01 (2006.01)

(52) U.S. Cl.
CPC ............ *G06T 19/006* (2013.01); *G06F 3/011* (2013.01); *G06T 19/20* (2013.01)

(58) Field of Classification Search
CPC ........ G06T 19/006; G06T 19/20; G06T 11/60
See application file for complete search history.

(56) References Cited

U.S. PATENT DOCUMENTS

| | | | |
|---|---|---|---|
| 2013/0044128 A1* | 2/2013 | Liu | G09G 5/00 345/633 |
| 2013/0293580 A1* | 11/2013 | Spivack | G06Q 30/0643 345/633 |
| 2015/0091943 A1 | 4/2015 | Lee | |
| 2015/0187138 A1 | 7/2015 | Mullins | |
| 2015/0356790 A1 | 12/2015 | Hammond | |
| 2016/0163109 A1 | 6/2016 | Kobayashi | |
| 2016/0217590 A1 | 7/2016 | Mullins et al. | |
| 2016/0335808 A1* | 11/2016 | Novak | G06T 19/006 |
| 2017/0301143 A1* | 10/2017 | Gorumkonda | G06T 19/006 |

OTHER PUBLICATIONS

International Search Report and Written Opinion for International Patent Application No. PCT/US20171049132, dated Jan. 2, 2018, 16 pages.

* cited by examiner

*Primary Examiner* — Jeffery A Brier
(74) *Attorney, Agent, or Firm* — Jordan IP Law, LLC (57) ABSTRACT

Systems, apparatuses and methods may provide a technology-based way to adapt non-augmented realty (AR) content from a content platform for display in an AR environment. More particularly, systems, apparatuses and methods may provide a way to render an AR environment including some portion of the adapted non-AR content based on one or more physical contexts or device contexts. Systems, apparatuses and methods may provide for modifying one or more readability parameters of the information rendered in the AR environment based on one or more physical contexts or device contexts to improve the readability of non-AR content adapted to AR.

25 Claims, 7 Drawing Sheets

AUGMENTED REALITY RENDERED STRUCTURED CONTENT

TECHNICAL FIELD

Embodiments generally relate to presenting information in an augmented realty (AR) environment. More particularly, embodiments relate to a way to adapt/render non-AR content in AR by setting/modifying one or more readability parameters of the non-AR content based on one or more physical contexts or device contexts.

BACKGROUND

Popular AR devices (e.g., MICROSOFT HOLOLENS or GOOGLE GLASS) make use of a see-through or "heads up" display to visually present information with a graphical user interface (GUI) to digitally project content directly in front of a user or placed on a physical surface such as a table or wall. AR content frequently uses AR-specific modifications and is often limited to universal or fixed-form appearances. For example, an AR photo viewer may maintain photos opaque and on top of a transparent layer of a see-through or heads up display. Current AR devices often persist the appearance of non-AR content (e.g., opaque photos and text, such as content of a website or mobile web application) regardless of the environment so that the non-AR content impairs/blocks the field of view of the user (e.g., as the user attempts to move about an environment). Problematic situations occur when AR devices attempt to render non-AR content from a content platform, such as a web browser, designed for display on a desktop or mobile computing device that renders non-AR content (e.g., video, text, images) with a background/surface (e.g., an opaque white).

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Figure 1:
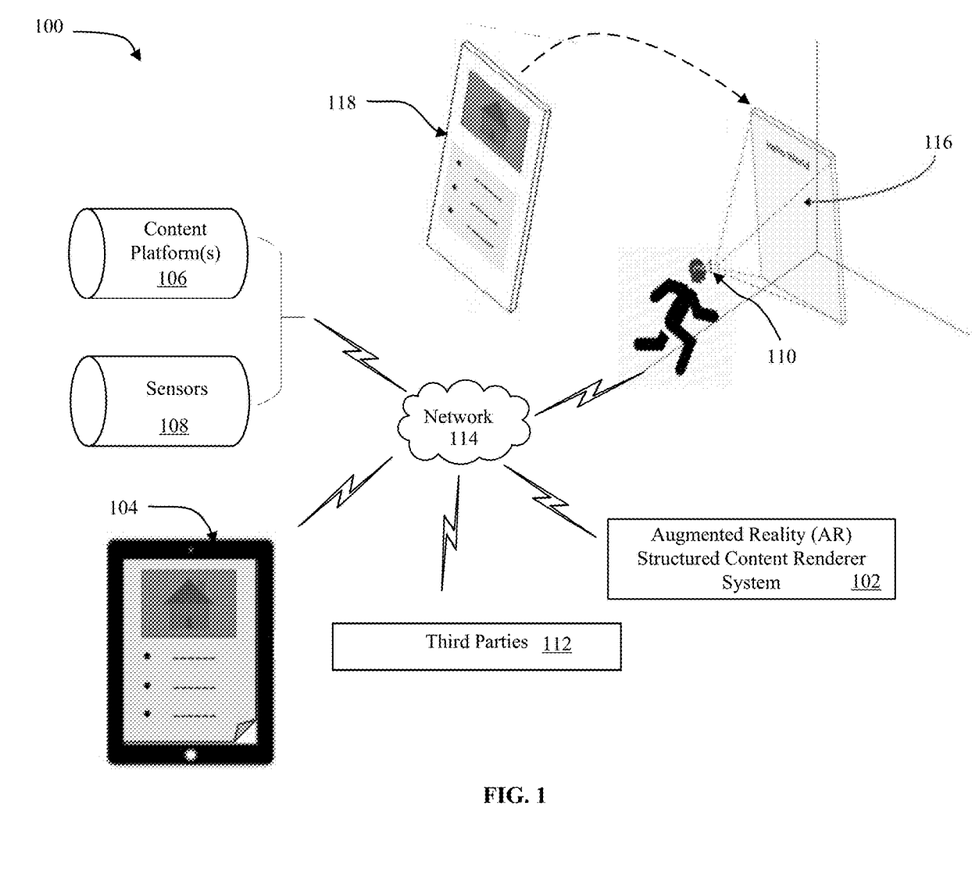
FIG. 1 is an illustration of an example of an augmented reality (AR) structured content renderer (SCR) system configuration according to an embodiment.

Turning now to FIG. 1, is an illustration of an example of an augmented reality (AR) structured content renderer (SCR) system configuration 100. The AR SCR system configuration 100 includes an AR SCR system 102, which may include, receive and/or retrieve content (e.g., information, including AR content and/or non-AR content 104) from one or more content platforms 106, and sensor measurements from one or more sensors 108.

The AR SCR system 102 may communicate with one or more AR devices 110 held, worn and/or operated by one or more users. A user holding, wearing and/or holding an AR device 110 (e.g., a visor or transparent tablet) may quickly browse a website rendered in the field of view of the user and positioned at some configurable distance from the user, while the sensors 108 record one or more environmental factors (e.g., physical conditions/activities). The environmental factors may include motion of one or more users or objects, for example, a user wearing an AR-device (e.g., visor) while operating a drone (e.g., terrestrial, aerial, aquatic) recorded by one or more sensors (e.g., on/in the AR-device, drone or some other location or device). To prevent the content from blocking the user's visibility of the surrounding environment, readability parameters (e.g., content opacity/translucency) may be adjusted based on one or more environmental factors (e.g., movement, speed, light, noise, location, orientation, etc.).

For example, the AR SCR system 102 may modify one or more readability parameters differently based on the rate of speed of the user performing an activity (e.g., walking, running) or a drone operated by the user navigating a physical environment. In another example, the AR SCR system 102 may adapt the non-AR content to block the rendering of browser pop-ups in the layer composite for rates of speed of one or more users and/or object above or below a rate of speed threshold value or value range in order to improve readability. User controls may allow the user to override the value of one or more readability parameters modified by the AR SCR system 102. The AR SCR system 102 may modify the information rendered in the layer composite on a level of granularity (e.g., a per pixel or half-pixel basis) based on one or more readability parameters, including modifying the appearance of the inner content, in addition to the shape and/or size of the content.

Third parties 112 may provide one or more AR models, image recognition models, scenarios heuristics and/or content (e.g., AR content and non-AR content) based on one or more of a user profile or environmental factors recorded by the sensors, including a user's location and user's activity. The AR SCR system 102 may communicate with various components of the AR SCR system configuration 100 via a network 114 (e.g., the Internet).

The AR SCR system 102 may enable a content platform 106, such as a web browser, to adapt non-AR content 104 to AR. The AR SCR system 102 may continuously modify the layer composite 116 rendered (e.g., projected) content 118 appearance and user controls based on the physical environment and/or environmental factor (e.g., texture and color of and distance to objects and surfaces, ambient light) recorded by the sensors 108.

For example, in one embodiment, when a user enters a poorly lit room or when information is rendered on a dark colored surface, the layout controller may modify one or more readability parameters including the layout path, style, font size, color, form, shape or opacity of the information rendered in the layer composite to improve readability of the information. The AR SCR system 102 may generate and evaluate one or more permutations of readability parameters settings based on one or more of the environmental factors, users' profiles or readability thresholds. The AR SCR system 102 may train and/or set readability parameters and/or the readability thresholds based on one or more users' feedback (e.g., adjustments to user controls), users' profile or sensors tests conducted by the AR SCR system 102 and/or another component or subsystem of the AR SCR system 102.

Figure 2:
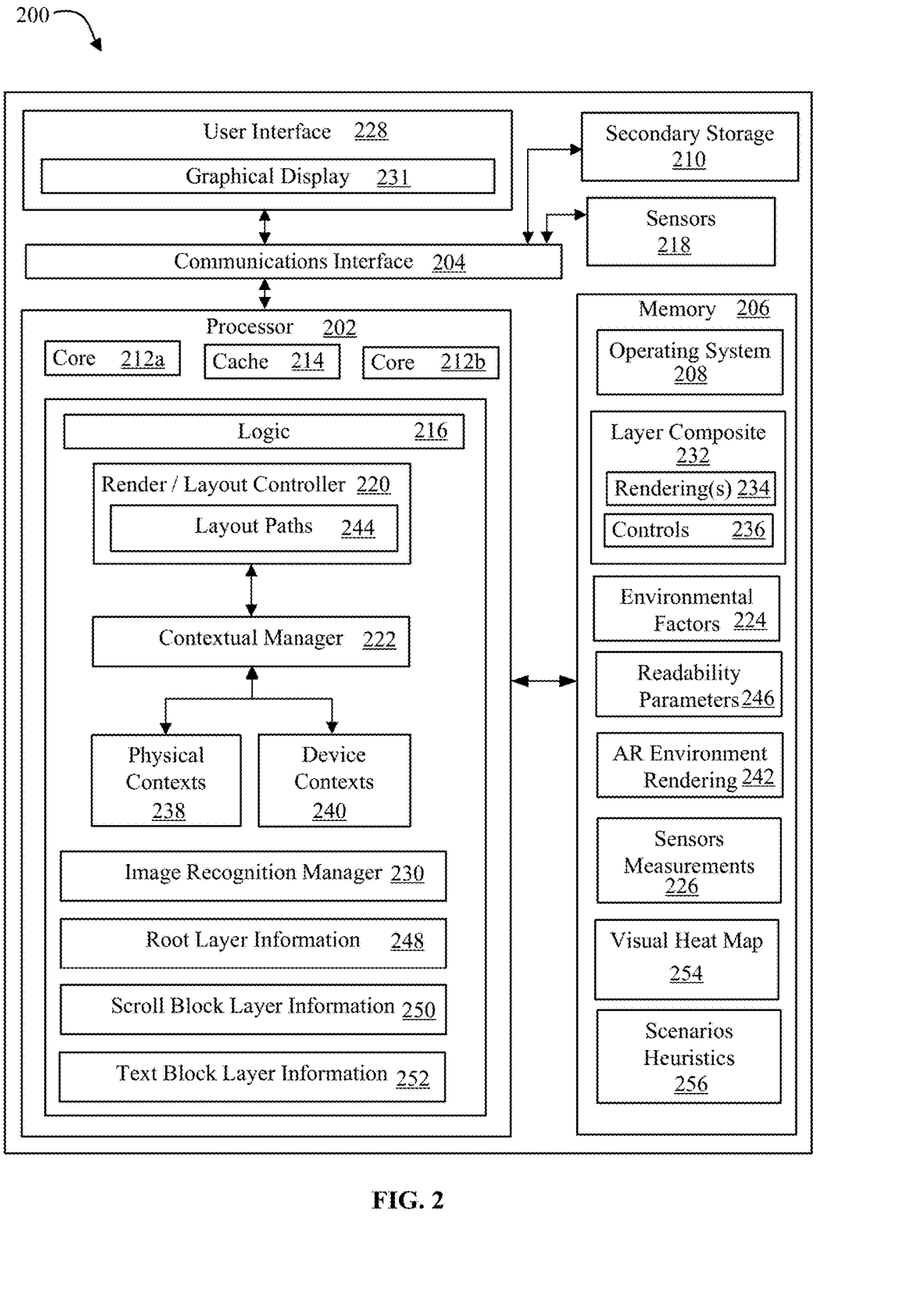
FIG. 2 is a block diagram of an example of an AR SCR system according to an embodiment.

FIG. 2 is a block diagram of an example of an AR SCR system 200 according to an embodiment. The AR SCR system 200 which may be readily substituted for the system 102 (FIG. 1), already discussed, may include a processor 202, a communications interface 204 and memory 206 coupled to the processor 202. The processor 202 runs an operating system (OS) 208. The memory 206 may be external to the processor 202 (e.g., external memory), and/or may be coupled to the processor 202 by, for example, a memory bus. In addition, the memory 206 may be implemented as main memory. The memory 206 may include, for example, volatile memory, non-volatile memory, and so on, or combinations thereof. For example, the memory 206 may include dynamic random access memory (DRAM) configured as one or more memory modules such as, for example, dual inline memory modules (DIMMs), small outline DIMMs (SODIMMs), etc., read-only memory (ROM) (e.g., programmable read-only memory (PROM), erasable PROM (EPROM), electrically EPROM (EEPROM), etc.), phase change memory (PCM), and so on, or combinations thereof. The memory 206 may include an array of memory cells arranged in rows and columns, partitioned into independently addressable storage locations. The processor 202 and/or operating system 208 may use a secondary memory storage 210 with the memory 206 to improve performance, capacity and flexibility of the AR SCR system 200.

The AR SCR system 200 may include cores 212a, 212b that may execute one or more instructions such as a read instruction, a write instruction, an erase instruction, a move instruction, an arithmetic instruction, a control instruction, and so on, or combinations thereof. The cores 212a, 212b may, for example, execute one or more instructions to move data (e.g., program data, operation code, operand, etc.) between a cache 214 or a register (not shown) and the memory 206 and/or the secondary memory storage 210, to read the data from the memory 206, to write the data to the memory 206, to perform an arithmetic operation using the data (e.g., add, subtract, bitwise operation, compare, etc.), to perform a control operation associated with the data (e.g., branch, etc.), and so on, or combinations thereof. The instructions may include any code representation such as, for example, binary code, octal code, and/or hexadecimal code (e.g., machine language), symbolic code (e.g., assembly language), decimal code, alphanumeric code, higher-level programming language code, and so on, or combinations thereof. Thus, for example, hexadecimal code may be used to represent an operation code (e.g., opcode) of an x86 instruction set including a byte value "00" for an add operation, a byte value "8B" for a move operation, a byte value "FF" for an increment/decrement operation, and so on.

The AR SCR system 200 may include logic 216 to coordinate processing among various components and/or subsystems of the AR SCR system 200. The AR SCR system 200 may include one or more sensors 218, a layout controller 220 and a contextual manager 222.

The sensors 218 may record one or more environmental factors 224 of a physical environment, including actions of one or more users or objects as sensor measurements 226 (e.g., sensor data). The sensors 218 may include one or more of chemical sensors, accelerometers, visual sensors (e.g., depth, distance, cameras, optical sensors), infrared sensors, pressure sensors, thermal sensors, global positioning system (GPS) locating sensors or inertial movement sensors, wherein the one or more sensors are to record environmental factors (e.g., sensory data) including one or more of visual, audio, motion, tactile, smell, chemical, atmospheric pressure or thermal data.

The AR SCR system 200 may include one or more user interfaces 228 including one or more graphical displays 231 to display/view a layer composite 232 that includes a rendering 234 of the information in one or more AR environments, and user controls 236. The AR SCR system 200 may translate/adapt non-AR content user controls (e.g., buttons presented by a non-AR content platform such as a web browser) into gaze controls or audio controls in order to navigate the information/content rendered in the layer composite. The user controls 236 may allow the user to override the value of one or more readability parameters set and/or modified by the AR SCR system 200, and set and/or modify user readability threshold preferences. The AR SCR system 200 may include one or more actuators (not shown) to adjust, torque, and/or tilt one or more user interfaces 228 or graphical displays 231 to improve readability of the information rendered in the layer composite 232 based on one or more physical contexts or device contexts.

The contextual manager 222 may identify one or more of physical contexts 238 or device contexts 240 from the one or more environmental factors 224. The contextual manager 222 may translate context-specific input into desirable rendering and layout paths for use in rendering information in AR. The environmental factors 224 may include, for example, motion, visual elements and patterns, or environments determined by one or more of visual, audio, tactile, smell or thermal signatures, chemicals, or atmospheric pressure recorded by the sensors 218. The environmental factors 224 may identify one or more locations/environments (e.g., a kitchen, laboratory, work space, flight path, disaster site), users or objects by one or more of name, color, size, sound characteristics, radio identifier, motion, tactile, smell, chemical or thermal signatures, the characteristic of a particular gesture of one or more of a user and/or object. The device contexts 240 may include one or more of a gaze of a user, a gesture of the user or orientation of one or more of the AR-device or the sensors. The physical contexts 238 may include one or more of motion or speed of the user or the one or more objects, distance of the user to the one or more objects, distance of the user to one or more surfaces or locations, temperature, lighting, surface colors, surface textures, non-visual information or sound.

The AR SCR system 200 may include an image recognition manager 230 that recognizes users, objects, surfaces, environmental factors, and/or activities performed by one or more users or objects recorded by the sensors 218 in an environment. The image recognition manager 230 may include and/or use one or more recognition algorithms and recognition models with recognition rules to recognize one or more users, objects, surfaces, environmental factors, and/or activities performed by one or more users or objects.

In one embodiment, the AR SCR system 200 may include a subsystem (e.g., implemented employing an augmented reality software development kit SDK) that performs marker and "markerless" tracking to track objects. The AR SCR system may include object recognition and tracking components, and tracking algorithms for speech recognition, gesture recognition based on motion sensing, proximity detection based on motion sensing, reed switch and/or NFC (near field communications) tracking.

The layout controller 220 may generate the layer composite 232 to include a rendering of an AR environment 242 including information (e.g., non-AR content adapted to AR)

rendered in a layout path 244 based on the one or more of the physical contexts 238 or device contexts 240.

The layout controller 220 and/or contextual manager 222 may modify one or more readability parameters 246, on a configurable level of granularity (e.g., per pixel or half-pixel basis) of the layer composite, including the layout path 244, font size, color, form, shape or opacity of the information rendered in the layer composite 232 to improve readability of the information based one or more environmental factors.

The AR SCR system 200 may dynamically modify the parameters used as readability parameters 246, as well as the threshold values and/or value ranges for the readability parameters 246, based on one or more of physical contexts 238, device contexts 240, user feedback (e.g., adjustments to user controls 236) or readability test performed by one or more of the sensors 218. The AR SCR system 200 may also include an audio recognition system (not shown) to receive user adjustments to the user controls 236 to view the layer composite 232. The layout controller 220 may render the information onto one or more objects or surfaces rendered in the layer composite 232 to improve readability of the information.

The AR SCR system 200 may receive the information rendered in the layer composite 232 from a content platform (e.g., a web browser not shown). Non-AR content from a content platform may include one or more of HTML (Hypertext Markup Language), CSS (Cascaded Style Sheet) or JAVASCRIPT to render the non-AR content in a non-AR environment. The information may identify one or more of root layer information 248, scroll block layer information 250 or text block layer information 252 used by the content platform (e.g., web browser) to present non-AR content in one or more of the root layer, scroll block layer or text block layer. The layout controller 220 may render one or more of the root layer information 248, the scroll block layer information 250 or the text block layer information 252, and the AR environment in the layer composite 232.

The AR SCR system 200 may further generate a visual heat map 254 (e.g., and/or one or more visual interest indicators) from the sensor measurements 226 to identify one or more objects or surfaces to analyze for use in one or more layout paths 244. The visual heat map 254 may identify one or more objects or surfaces recorded by the sensors 218 to analyze based on one or more physical contexts or device contexts that the contextual manager 222 may identify.

The AR SCR system 200 and/or contextual manager 222 may use scenario heuristics 256 that identify one or more activities (e.g., performed by one or more users or objects in an environment recorded by the sensors) or environmental factors determined to identify one or more particular physical contexts 238, device contexts 240 or readability thresholds values and/or ranges to use to render the layer composite. For example, when a user in a kitchen (e.g., a location) engaged in cooking (e.g., physical activity) communicates to the AR device to present a recipe (e.g., non-AR content) from a content platform (e.g., website), the content received may be unreadable based on where the recipe is projected in AR. The AR SCR system 200 may calculate the distance (e.g. virtual distance in AR) on which the content (e.g., webpage) may be projected (e.g. relative to the eyes of the user/wearer of an AR-device), and the web browser (e.g., web engine) and/or the AR SCR system 200 may adapt the scale factor of the content while preserving the text (e.g., of the recipe) without blocking the user's field of view in the AR-device.

The AR SCR system 200 may provide multiple training modes, including explicit training and passive training modes to improve the readability of information rendered in an AR environment. During explicit training, the user may provide some indicator that training is about to be performed, which may be via a verbal or gesture prefix, or through a verbal sentence construction. During passive training, the AR SCR system 200 may observe operations and attempt to build rules based on the observed operations. During hybrid training, the AR SCR system 200 may responsively prompt the user to explicitly train the AR SCR system 200, the contextual manager 222 and/or any other component of the AR SCR system 200. Then the AR SCR system 200 may observe, via sensors, various environmental factors and attempt to build additional rules to improve recognition accuracy. The AR SCR system 200 may utilize recognition rules created by one or more users (e.g., crowd sourcing). The AR SCR system 200 may utilize rules created (e.g., generated) by one or more users during, for example, explicit training to improve accuracy of recognition or/and shorten the training time. The AR SCR system 200 may utilize rules created (e.g., generated) by one or more users to predict/guess the intent (e.g., heuristics scenarios) of a current user.

Figure 3:
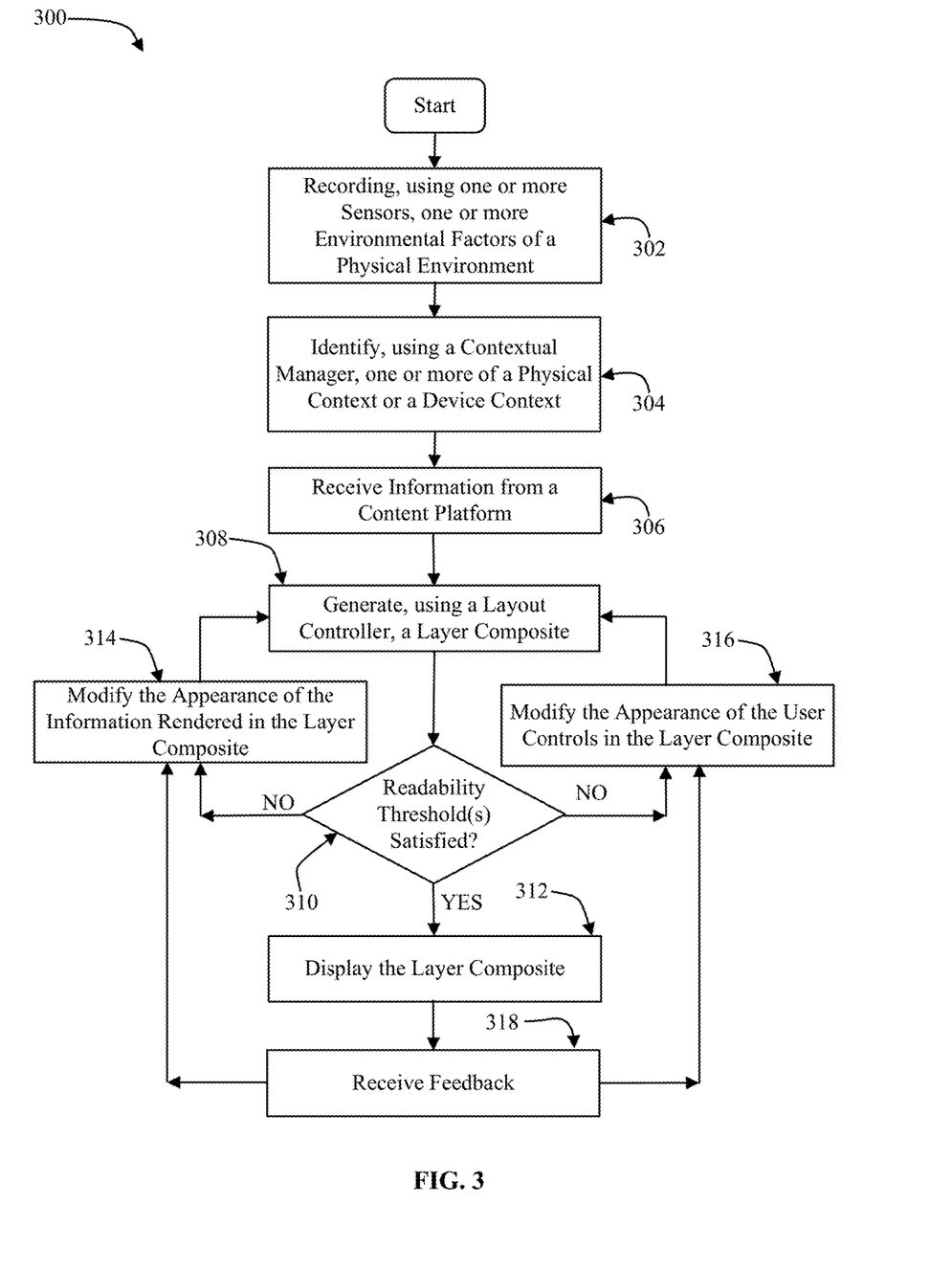
FIG. 3 is a flowchart of an example of a method of generating a layer composite according to an embodiment.

FIG. 3 shows an example of a method 300 of generating a layer composite according to an embodiment. The method 300 may be implemented as a module or related component in a set of logic instructions stored in a non-transitory machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality hardware logic using circuit technology such as, for example, application specific integrated circuit (ASIC), complementary metal oxide semiconductor (CMOS) or transistor-transistor logic (TTL) technology, or any combination thereof. For example, computer program code to carry out operations shown in the method 400 may be written in any combination of one or more programming languages, including an object oriented programming language such as JAVA, SMALLTALK, C++ or the like and conventional procedural programming languages, such as the "C" programming language or similar programming languages.

Illustrated processing block 302 provides for recording, using one or more sensors, one or more environmental factors (e.g., movement, speed, light, noise, position, orientation, etc.) of a physical environment. The environmental factors may be recorded by sensors located on/in one or more AR-devices and/or the physical environment. The environmental factors may be recorded, individually, concurrently or at different times depending on the one or more environmental factors to be recorded.

Illustrated processing block 304 provides for identifying, using a contextual manager, one or more physical contexts or device contexts from the environmental factors. The contextual manager may set readability parameters for the non-AR content adapted to AR based on one or more user feedback, profiles and/or environmental factors.

The contextual manager and/or image recognition manager may build and/or train one or more recognition models in one or more modalities to identify one or more physical contexts or device contexts. The modalities may include motion, visual elements and patterns, or environments determined by one or more of visual, audio, tactile, smell or thermal signatures, chemicals, pressure, radio identifier (ID) of an object, or radio presence including RFID (radio frequency identifier), near field communications (NFC), Bluetooth, WiFi, frequency and radio pattern, signal strength, or capacitance. The contextual manager and/or image recognition manager may build recognition models by creating one or more recognition rules based on the quantity and quality of the one or more matches and/or correlations between one or more physical contexts or device contexts identified from the sensor data across one or more modalities. The contextual manager and/or image recognition manager may create new recognition models by combining one or more components of one or more completed or partially completed recognition models. New recognition models may also be provided by one or more third parties to improve cycle time for generating layer composites and the readability of the non-AR content adapted to AR.

Illustrated processing block 306 provides for the AR SCR system receiving and/or retrieving information from a content platform (e.g., web browser). In one embodiment, the content platform may be implemented with AR SCR system logic to responsively translate/adapt non-AR content to AR. The information received and/or retrieved from one or more content platforms may be based on one or more user feedback, profiles and/or environmental factors.

Illustrated processing block 308 provides for generating, using a layout controller, one or more layer composites for display in/on one or more AR-device. The layer composites may be generated using readability parameters settings identified by the contextual manager based on one or more user feedback, profiles and/or environmental factors. The layer composites render information projected onto one or more surfaces and/or objects in a physical environment viewable by one or more users using an AR-device. The physical environment recorded by the sensors may be used as a default background for the layer composites with which to compare and/or analyze information to be rendered, e.g., in the foreground of the layer composite, so as to improve the readability of the information. For example, comparing the contrasting (e.g., at a level of granularity such as per pixel or half-pixel) appearance of information projected onto surfaces and/or objects in AR with the appearance of the surfaces and/or objects, the readability parameters of the information may be modified to improve the readability of the information (e.g., the visual contrast between the information and the surfaces and/or objects onto which the information may be projected/rendered in AR).

Illustrated processing block 310 provides for determining whether the readability parameters settings satisfy one or more readability thresholds (e.g., values and/or value ranges). The readability of the information rendered in the layer composite may be evaluated on one or more levels of granularity (e.g., pixel or half-pixel) based on user feedback (e.g., user gaze or gestures, audio controls) and/or sensors measurements.

Illustrated processing block 312 provides for displaying the layer composite, when the readability parameters satisfy the readability thresholds. The layer composite may be displayed on one or more AR-devices to augment a physical environment with non-AR content adapted to AR. A user holding and/or wearing an AR-device, and/or operating a drone may navigate a physical environment, in which sensors record dynamic variances in environmental factors as the physical environment is navigated. The readability parameters may be continuously evaluated responsive to variances in environmental factors recorded as the physical environment is navigated. For example, navigating to/from brightly lit locations to/from dimly lit locations, the readability parameters of information may be set/modified to improve readability of the information in AR, such as darkening or lightning the color of the information at a configurable level of granularity (e.g., pixel or half-pixel).

Illustrated processing block 314 provides for modifying the appearance of the information rendered in the layer composite, when one or more readability parameters do not satisfy one or more readability thresholds. The information rendered in the layer composite may be modified on one or more levels of granularity (e.g., pixel or half-pixel) based on user feedback and/or sensors measurements.

Illustrated processing block 316 provides for modifying the appearance of the user controls in the layer composite, when one or more readability parameters do not satisfy one or more readability thresholds. The user controls rendered in the layer composite may be modified based on one or more readability parameters at one or more levels of granularity (e.g., pixel or half-pixel) based on user feedback and/or sensors measurements.

Illustrated processing block 318 provides for receiving input and/or feedback from one or more users or sensors to modify one or more readability parameters of the information rendered in the layer composite. The user may use a gaze, gestures and/or audio controls of the AR-device to modify one or more readability parameters. The results of one or more tests for the readability of the information (e.g., performed by one or more sensors) as rendered in AR may be used to modify one or more readability parameters.

Figure 4A:
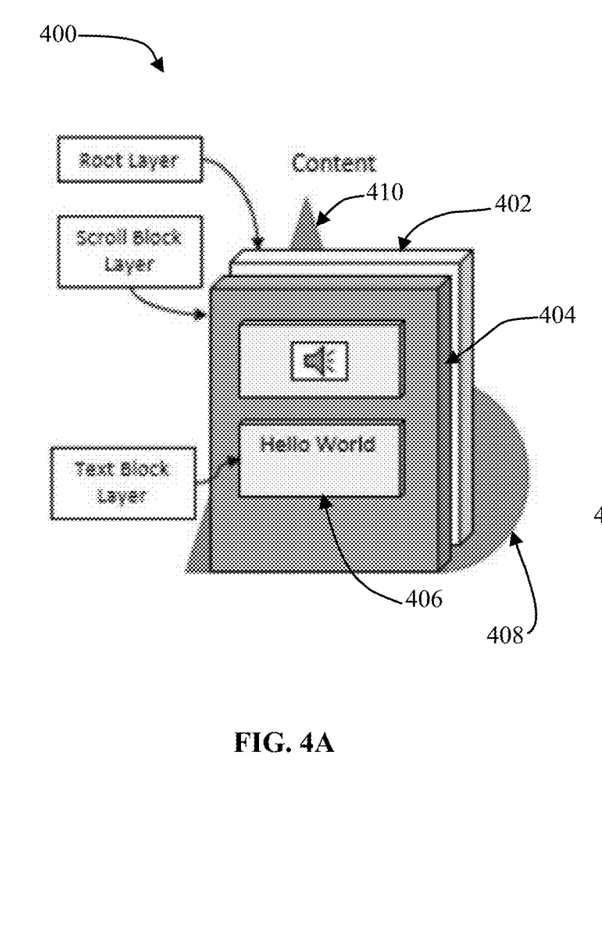
FIG. 4A is a block diagram of an example of non-AR content according to an embodiment.

FIG. 4A is a block diagram 400 of an example of non-AR content according to an embodiment, illustrates layers of non-AR content a content platform (e.g., web browser) may lay out and render with a desktop or mobile device. The non-AR content may include one or more of a root layer 402, scroll block layer 404 or text block layer 406 used by the content platform (e.g., web browser) to present the non-AR content (e.g., information). The content platform (e.g., web browser) may render opaque background for the one or more of the root layer 402, scroll block layer 404 or text block layer 406 so that one or more surfaces or objects 408, 410 in an environment are obscured (e.g., blocked) from view when viewed in the field of view of an AR-device user interface (e.g., display).

Figure 4B:
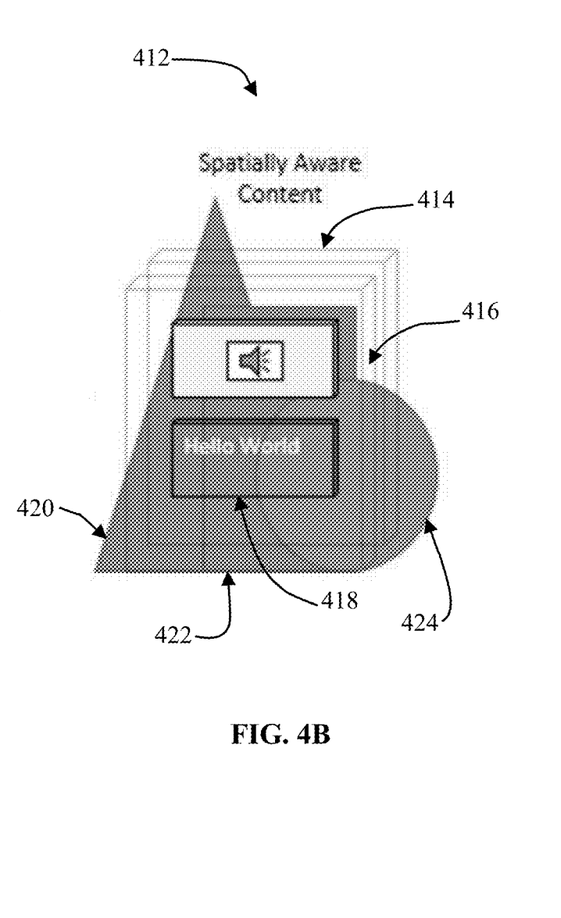
FIG. 4B is a block diagram of an example of non-AR content adapted to an AR environment according to an embodiment.

FIG. 4B is a block diagram 412 of an example of non-AR content adapted to an AR environment according to an embodiment. The AR SCR system may generate a layer composite, considered "spatially aware content", rendered on/in an AR-device user interface that adapts the root layer information, the scroll block layer information and text block layer information to AR. For example, the AR SCR system may blend (e.g., reduce or eliminate the opacity) the information (e.g., non-AR content) from one or more of the root layer 414, the scroll block layer 416 or text block layer 418 with the physical background environment surfaces and/or objects 420, 422, 424. The AR SCR system may adapt the root layer information, the scroll block layer information and text block layer information to AR by modifying the readability parameters of the information. For example, the AR SCR system may modify the readability parameters (e.g., styling) of the information while ensuring certain foreground content (e.g., some portion of the information) remains visible against the one or more surfaces or objects. The layer containing content (e.g., a video) may be controlled through AR inputs, such as a user gaze and/or focus, and may automatically pause playback of content (e.g., a video) when, e.g., the content (e.g., information) is not relevant to one or more environmental factors recorded in the user's field of view or location.

Figure 5A:
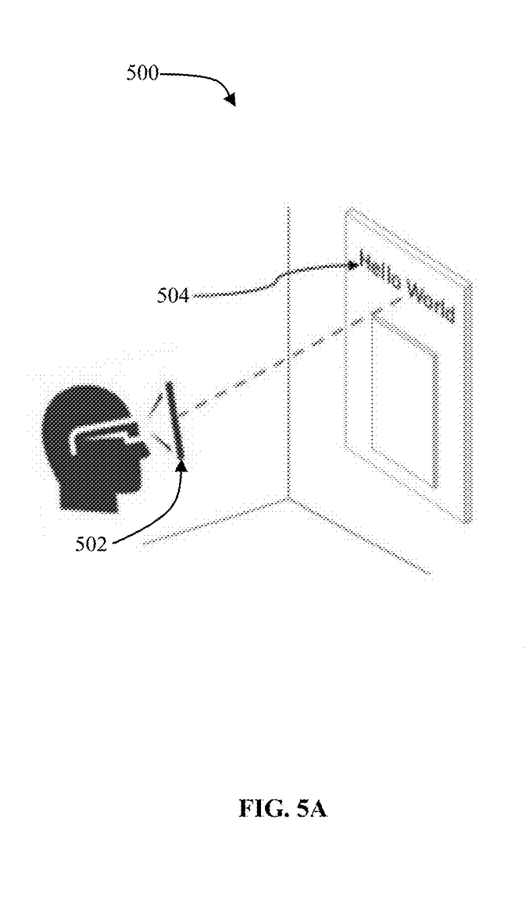
FIGS. 5A and 5B are block diagrams of examples of renderings of non-AR content in an AR environment according to the lighting in a physical environment according to one or more embodiments.

FIG. 5A is a block diagram 500 of an example of a rendering of non-AR content in an AR environment according to the lighting in a physical environment according to an embodiment. For example, when a user of an AR-device 502 (e.g., HoloLens) attempts to read non-AR content (e.g., a website) rendered/projected on one or more of a surface, object or wall in the field of view of the user, the AR SCR system may calculate and use the distance, in which the content 504 is to be projected onto surfaces and/or shapes of objects in the environment, in order to modify the readability parameters (e.g., color, opacity, font size, form, shape, style or layout) of the content, and/or determine the projected surfaces and/or the shapes of objects to use to display the content to improve readability of the content 504.

Figure 5B:
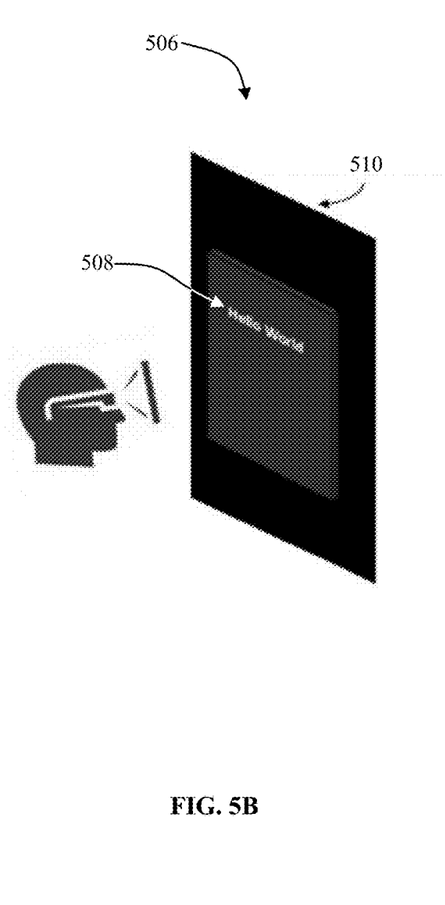

FIG. 5B is a block diagram 506 of another example of renderings of non-AR content in an AR environment according to the lighting in a physical environment according to an embodiment. For example, the AR SCR system may responsively generate a layout and appearance of the content 508 so that the content 508 may be readable in low-light and/or placed on one or more dark colored or lit surfaces or objects. The AR SCR system may provide "night mode" readability thresholds values and/or ranges used to improve readability of content 508 rendered on a dark background 510 and/or due to low-visibility in the environment.

Figure 6:
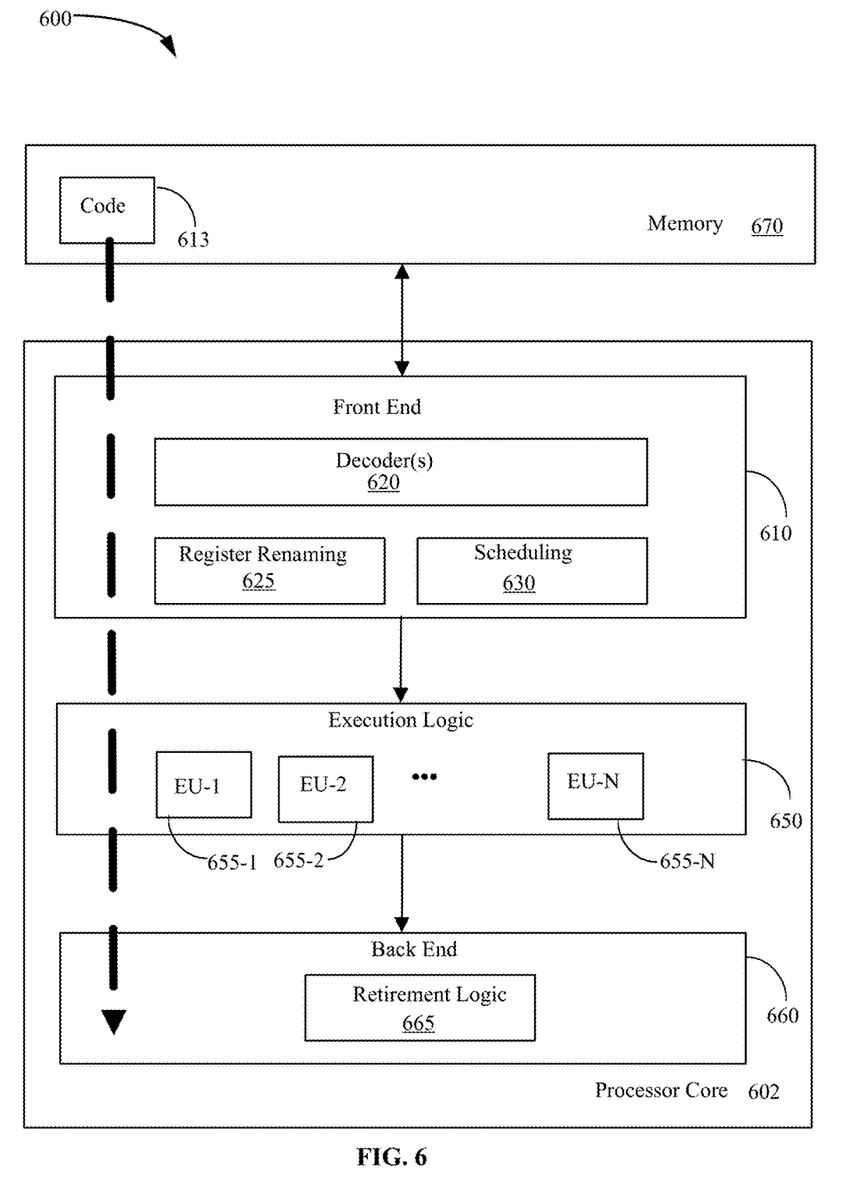
FIG. 6 is a block diagram of an example of a processor according to an embodiment.

FIG. 6 is a block diagram 600 of an example of a processor core 602 according to one embodiment. The processor core 602 may be the core for any type of processor, such as a micro-processor, an embedded processor, a digital signal processor (DSP), a network processor, or other device to execute code. Although only one processor core 602 is illustrated in FIG. 6, a processing element may alternatively include more than one of the processor core 602 illustrated in FIG. 6. The processor core 602 may be a single-threaded core or, for at least one embodiment, the processor core 602 may be multithreaded in that it may include more than one hardware thread context (or "logical processor") per core.

FIG. 6 also illustrates a memory 607 coupled to the processor core 602. The memory 607 may be any of a wide variety of memories (including various layers of memory hierarchy) as are known or otherwise available to those of skill in the art. The memory 670 may include one or more code 613 instruction(s) to be executed by the processor core 600, wherein the code 613 may implement the method 300 (FIG. 3), already discussed. The processor core 602 follows a program sequence of instructions indicated by the code 613. Each instruction may enter a front end portion 610 and be processed by one or more decoders 620. The decoder 620 may generate as its output a micro operation such as a fixed width micro operation in a predefined format, or may generate other instructions, microinstructions, or control signals which reflect the original code instruction. The illustrated front end portion 610 also includes register renaming logic 625 and scheduling logic 630, which generally allocate resources and queue the operation corresponding to the convert instruction for execution.

The processor core 602 is shown including execution logic 650 having a set of execution units 655-1 through 655-N. Some embodiments may include a number of execution units dedicated to specific functions or sets of functions. Other embodiments may include only one execution unit or one execution unit that can perform a particular function. The illustrated execution logic 650 performs the operations specified by code instructions.

After completion of execution of the operations specified by the code instructions, back end logic 660 retires the instructions of the code 613. In one embodiment, the processor core 600 allows out of order execution but requires in order retirement of instructions. Retirement logic 665 may take a variety of forms as known to those of skill in the art (e.g., re-order buffers or the like). In this manner, the processor core 602 is transformed during execution of the code 613, at least in terms of the output generated by the decoder, the hardware registers and tables utilized by the register renaming logic 625, and any registers (not shown) modified by the execution logic 650.

Although not illustrated in FIG. 6, a processing element may include other elements on chip with the processor core 602. For example, a processing element may include memory control logic along with the processor core 602. The processing element may include I/O control logic and/or may include I/O control logic integrated with memory control logic. The processing element may also include one or more caches.

Figure 7:
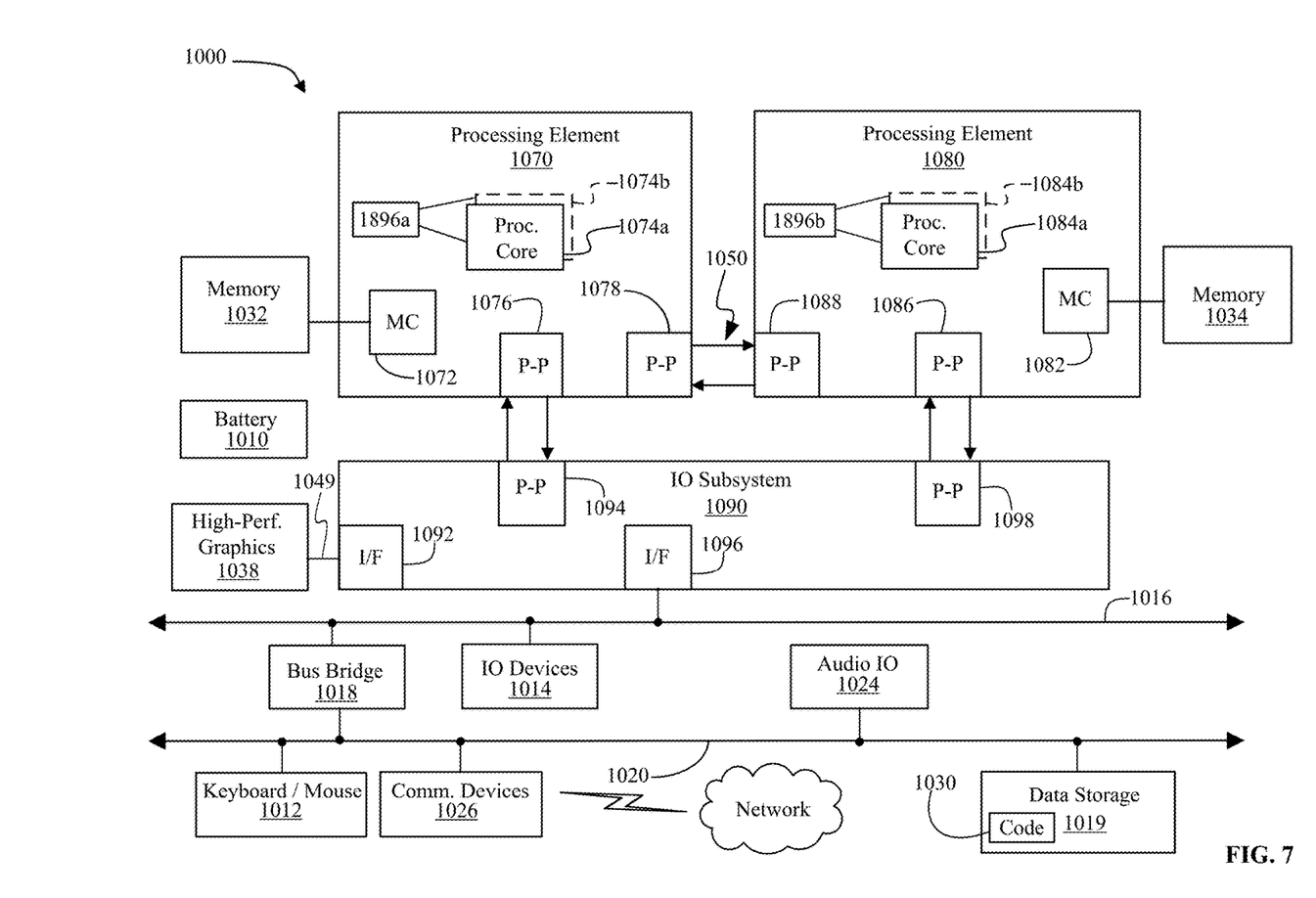
FIG. 7 is a block diagram of an example of a computing system according to an embodiment.

Referring now to FIG. 7, shown is a block diagram of a computing system 1000 embodiment in accordance with an embodiment. Shown in FIG. 7 is a multiprocessor system 1000 that includes a first processing element 1070 and a second processing element 1080. While two processing elements 1070 and 1080 are shown, it is to be understood that an embodiment of the system 1000 may also include only one such processing element.

The system 1000 is illustrated as a point-to-point interconnect system, wherein the first processing element 1070 and the second processing element 1080 are coupled via a point-to-point interconnect 1050. It should be understood that any or all of the interconnects illustrated in FIG. 7 may be implemented as a multi-drop bus rather than point-to-point interconnect.

As shown in FIG. 7, each of processing elements 1070 and 1080 may be multicore processors, including first and second processor cores (i.e., processor cores 1074a and 1074b and processor cores 1084a and 1084b). Such cores 1074a, 1074b, 1084a, 1084b may be configured to execute instruction code in a manner similar to that discussed above in connection with FIG. 6.

Each processing element 1070, 1080 may include at least one shared cache 1896a, 1896b. The shared cache 1896a, 1896b may store data (e.g., instructions) that are utilized by one or more components of the processor, such as the cores 1074a, 1074b and 1084a, 1084b, respectively. For example, the shared cache 1896a, 1896b may locally cache data stored in a memory 1032, 1034 for faster access by components of the processor. In one or more embodiments, the shared cache 1896a, 1896b may include one or more mid-level caches, such as level 2 (L2), level 3 (L3), level 4 (L4), or other levels of cache, a last level cache (LLC), and/or combinations thereof.

While shown with only two processing elements 1070, 1080, it is to be understood that the scope of the embodiments are not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to processor a first processor 1070, accelerators (such as, e.g., graphics accelerators or digital signal processing (DSP) units), field programmable gate arrays, or any other processing element. There can be a variety of differences between the processing elements 1070, 1080 in terms of a spectrum of metrics of merit including architectural, micro architectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

The first processing element 1070 may further include memory controller logic (MC) 1072 and point-to-point (P-P) interfaces 1076 and 1078. Similarly, the second processing element 1080 may include a MC 1082 and P-P interfaces 1086 and 1088. As shown in FIG. 7, MC's 1072 and 1082 couple the processors to respective memories, namely a memory 1032 and a memory 1034, which may be portions of main memory locally attached to the respective processors. While the MC 1072 and 1082 is illustrated as integrated into the processing elements 1070, 1080, for alternative embodiments the MC logic may be discrete logic outside the processing elements 1070, 1080 rather than integrated therein.

The first processing element 1070 and the second processing element 1080 may be coupled to an I/O subsystem 1090 via P-P interconnects 1076 1086, respectively. As shown in FIG. 7, the I/O subsystem 1090 includes P-P interfaces 1094 and 1098. Furthermore, I/O subsystem 1090 includes an interface 1092 to couple I/O subsystem 1090 with a high performance graphics engine 1038. In one embodiment, bus 1049 may be used to couple the graphics engine 1038 to the I/O subsystem 1090. Alternately, a point-to-point interconnect may couple these components.

In turn, I/O subsystem 1090 may be coupled to a first bus 1016 via an interface 1096. In one embodiment, the first bus 1016 may be a Peripheral Component Interconnect (PCI) bus, or a bus such as a PCI Express bus or another third generation I/O interconnect bus, although the scope of the embodiments are not so limited.

As shown in FIG. 7, various I/O devices 1014 (e.g., speakers, cameras, sensors) may be coupled to the first bus 1016, along with a bus bridge 1018 which may couple the first bus 1016 to a second bus 1020. In one embodiment, the second bus 1020 may be a low pin count (LPC) bus. Various devices may be coupled to the second bus 1020 including, for example, a keyboard/mouse 1012, communication device(s) 1026, and a data storage unit 1019 such as a disk drive or other mass storage device which may include code 1030, in one embodiment. The illustrated code 1030 may implement the method 300 (FIG. 3), already discussed, and may be similar to the code 613 (FIG. 6), already discussed. Further, an audio I/O 1024 may be coupled to second bus 1020 and a battery 1010 may supply power to the computing system 1000.

Note that other embodiments are contemplated. For example, instead of the point-to-point architecture of FIG. 7, a system may implement a multi-drop bus or another such communication topology. Also, the elements of FIG. 7 may alternatively be partitioned using more or fewer integrated chips than shown in FIG. 7.

ADDITIONAL NOTES AND EXAMPLES

Example 1 may include an augmented reality (AR) structured content renderer (SCR) apparatus comprising one or more sensors to record one or more environmental factors of a physical environment, a contextual manager to identify one or more of a physical context or a device context from the one or more environmental factors, and a layout controller to generate a layer composite comprising a rendering of an augmented realty (AR) environment including information rendered in a layout path based on the one or more of the physical context or the device context.

Example 2 may include the apparatus of Example 1, wherein the layout controller is to modify one or more readability parameters including the layout path, font size, color, form, shape or opacity of the information rendered in the layer composite to improve readability of the information.

Example 3 may include the apparatus of Example 2, wherein the layout controller is to render the information onto one or more objects or surfaces rendered in the layer composite to improve readability of the information rendered in the layer composite.

Example 4 may include the apparatus of Example 3, wherein the device context is to include one or more of a gaze of a user, a gesture of the user or orientation of the one or more sensors.

Example 5 may include the apparatus of Example 4, wherein the physical context is to include one or more of motion or speed of the user or the one or more objects, distance of the user to the one or more objects, distance of the user to one or more surfaces or locations, temperature, lighting, surface colors, surface textures, non-visual information or sound.

Example 6 may include the apparatus of Example 1, further comprising a user interface to display the layer composite to a user and to receive user input.

Example 7 may include the apparatus of Example 6, wherein the layer composite is to include user controls to use to view the layer composite.

Example 8 may include the apparatus of Example 1, wherein the information is to be received from a content platform, wherein the content platform is to be a web browser, and wherein the information is to identify one or more of root layer information, scroll block layer information or text block layer information for the web browser.

Example 9 may include the apparatus of any one of Examples 1 to 8, wherein the layout controller is to render one or more of the root layer information, the scroll block layer information or the text block layer information, and the AR environment in the layer composite.

Example 10 may include a method of rendering augmented reality (AR) structured content comprising recording, using one or more sensors, one or more environmental factors of a physical environment, identifying, using a contextual manager, one or more of a physical context or a device context from the one or more environmental factors, and generating, using a layout controller, a layer composite comprising a rendering of an augmented realty (AR) environment including information in a layout path based on the one or more of the physical context or the device context.

Example 11 may include the method of Example 10, further comprising modifying one or more readability parameters including the layout path, font size, color, form, shape or opacity of the information rendered in the layer composite to improve readability of the information.

Example 12 may include the method of Example 10, wherein the information is rendered onto one or more objects or surfaces rendered in the layer composite to improve readability of the information rendered in the layer composite.

Example 13 may include the method of Example 12, wherein the device context identified from the one or more environmental factors includes one or more of a gaze of a user, a gesture of the user or orientation of the one or more sensors.

Example 14 may include the method of Example 13, wherein the physical context identified from the one or more environmental factors includes one or more of motion or speed of the user or the one or more objects, distance of the user to the one or more objects, distance of the user to one or more surfaces or locations, temperature, lighting, surface colors, surface textures, non-visual information or sound.

Example 15 may include the method of Example 10, wherein the layer composite includes user controls to use to view the layer composite.

Example 16 may include the method of Example 10, further comprising receiving the information from a content platform, wherein the content platform is to be a web browser, and wherein the information identifies one or more of root layer information, scroll block layer information or text block layer information for the web browser.

Example 17 may include the method of Example 16, wherein the layer composite includes a rendering of one or more of the root layer information, the scroll block layer information or the text block layer information, and the AR environment.

Example 18 may include at least one computer readable storage medium comprising a set of instructions, which when executed by a computing device, cause the computing device to record, using one or more sensors, one or more environmental factors of a physical environment, identify, using a contextual manager, one or more of a physical context or a device context from the one or more environmental factors, and generate, using a layout controller, a layer composite comprising a rendering of an augmented realty (AR) environment including information in a layout path based on the one or more of the physical context or the device context.

Example 19 may include the at least one computer readable storage medium of any one of Examples 10 to 18, wherein the instructions, when executed, cause a computing device to modify one or more readability parameters including the layout path, font size, color, form, shape or opacity of the information rendered in the layer composite to improve readability of the information.

Example 20 may include the at least one computer readable storage medium of Example 18, wherein the information is rendered onto one or more objects or surfaces rendered in the layer composite to improve readability of the information rendered in the layer composite.

Example 21 may include the at least one computer readable storage medium of Example 20, wherein the device context to be identified from the one or more environmental factors is to include one or more of a gaze of a user, a gesture of the user or orientation of the one or more sensors.

Example 22 may include the at least one computer readable storage medium of Example 21, wherein the physical context to be identified from the one or more environmental factors is to include one or more of motion or speed of the user or the one or more objects, distance of the user to the one or more objects, distance of the user to one or more surfaces or locations, temperature, lighting, surface colors, surface textures, non-visual information or sound.

Example 23 may include the at least one computer readable storage medium of Example 18, wherein the layer composite includes user controls to use to view the layer composite.

Example 24 may include the at least one computer readable storage medium of Example 18, wherein the instructions, when executed, cause a computing device to receive the information from a content platform, wherein the content platform is to be a web browser, and wherein the information is to identify one or more of root layer information, scroll block layer information or text block layer information for the web browser.

Example 25 may include the at least one computer readable storage medium of any one of Examples 18 to 24, wherein the layer composite is to include a rendering of one or more of the root layer information, the scroll block layer information or the text block layer information, and the AR environment.

Example 26 may include an augmented reality (AR) structured content renderer (SCR) apparatus comprising means for recording, using one or more sensors, one or more environmental factors of a physical environment, means for identifying, using a contextual manager, one or more of a physical context or a device context from the one or more environmental factors, and means for generating, using a layout controller, a layer composite comprising a rendering of an AR environment including information in a layout path based on the one or more of the physical context or the device context.

Example 27 may include the apparatus of Example 26, further comprising means for modifying one or more readability parameters including the layout path, font size, color, form, shape or opacity of the information rendered in the layer composite to improve readability of the information.

Example 28 may include the apparatus of Example 26, wherein the information is rendered onto one or more objects or surfaces rendered in the layer composite to improve readability of the information rendered in the layer composite.

Example 29 may include the apparatus of Example 28, wherein the device context identified from the one or more environmental factors includes one or more of a gaze of a user, a gesture of the user or orientation of the one or more sensors, and wherein the physical context identified from the one or more environmental factors includes one or more of motion or speed of the user or the one or more objects, distance of the user to the one or more objects, distance of the user to one or more surfaces or locations, temperature, lighting, surface colors, surface textures, non-visual information or sound.

Example 30 may include the apparatus of any one of Examples 26 to 29, further comprising means for receiving the information from a content platform, wherein the content platform is to be a web browser, wherein the information identifies one or more of root layer information, scroll block layer information or text block layer information for the web browser, and wherein the layer composite includes a rendering of one or more of the root layer information, the scroll block layer information or the text block layer information, and the AR environment.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the computing system within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. An apparatus comprising:
   one or more sensors to record one or more environmental factors of a physical environment,
   a contextual manager, implemented at least partly in one or more of configurable logic or fixed-functionality hardware logic using circuit technology, to identify one or more of a physical context or a device context from the one or more environmental factors, and
   a layout controller, implemented at least partly in one or more of configurable logic or fixed-functionality hardware logic using circuit technology, to generate a layer composite comprising a rendering of an augmented realty (AR) environment including information rendered in a layout path based on the one or more of the physical context or the device context, wherein the physical context is to include one or more of motion or speed, and wherein the layout controller is to modify one or more readability parameters on a level of granularity based on the motion or the speed.

2. The apparatus of claim 1, wherein the layout controller is to modify the one or more readability parameters including the layout path, font size, color, shape or opacity of the information rendered in the layer composite to improve readability of the information, and wherein the level of granularity is a half-pixel.

3. The apparatus of claim 2, wherein the layout controller is to render the information onto one or more objects or surfaces rendered in the layer composite to improve readability of the information rendered in the layer composite.

4. The apparatus of claim 3, wherein the device context is to include one or more of a gaze of a user, a gesture of the user or orientation of the one or more sensors.

5. The apparatus of claim 4, wherein the physical context is to further include one or more of distance of the user to the one or more objects, distance of the user to one or more surfaces or locations, temperature, lighting, surface colors, surface textures, non-visual information or sound.

6. The apparatus of claim 1, further comprising a user interface to display the layer composite to a user and to receive user input.

7. The apparatus of claim 6, wherein the layer composite is to include user controls to use to view the layer composite.

8. The apparatus of claim 1, wherein the information is to be received from a content platform, wherein the content platform is to be a web browser, and wherein the information is to identify one or more of root layer information, scroll block layer information or text block layer information for the web browser.

9. The apparatus of claim 8, wherein the layout controller is to render one or more of the root layer information, the scroll block layer information or the text block layer information, and the AR environment in the layer composite.

10. A method comprising:
    recording, using one or more sensors, one or more environmental factors of a physical environment,
    identifying, using a contextual manager, implemented at least partly in one or more of configurable logic or fixed-functionality hardware logic using circuit technology, one or more of a physical context or a device context from the one or more environmental factors,
    generating, using a layout controller, implemented at least partly in one or more of configurable logic or fixed-functionality hardware logic using circuit technology, a layer composite comprising a rendering of an augmented realty (AR) environment including information in a layout path based on the one or more of the physical context or the device context, wherein the physical context includes one or more of motion or speed, and
    modifying, using the layout controller, one or more readability parameters on a level of granularity based on the motion or the speed.

11. The method of claim 10, further comprising modifying the one or more readability parameters including the layout path, font size, color, shape or opacity of the information rendered in the layer composite to improve readability of the information, wherein the level of granularity is a half-pixel.

12. The method of claim 10, wherein the information is rendered onto one or more objects or surfaces rendered in the layer composite to improve readability of the information rendered in the layer composite.

13. The method of claim 12, wherein the device context identified from the one or more environmental factors includes one or more of a gaze of a user, a gesture of the user or orientation of the one or more sensors.

14. The method of claim 13, wherein the physical context identified from the one or more environmental factors further includes one or more of distance of the user to the one or more objects, distance of the user to one or more surfaces or locations, temperature, lighting, surface colors, surface textures, non-visual information or sound.

15. The method of claim 10, wherein the layer composite includes user controls to use to view the layer composite.

16. The method of claim 10, further comprising receiving the information from a content platform, wherein the content platform is to be a web browser, and wherein the information identifies one or more of root layer information, scroll block layer information or text block layer information for the web browser.

17. The method of claim 16, wherein the layer composite includes a rendering of one or more of the root layer information, the scroll block layer information or the text block layer information, and the AR environment.

18. At least one non-transitory computer readable storage medium comprising a set of instructions, which when executed by a computing device, cause the computing device to:
record, using one or more sensors, one or more environmental factors of a physical environment,
identify, using a contextual manager implemented at least partly in one or more of configurable logic or fixed-functionality hardware logic using circuit technology, one or more of a physical context or a device context from the one or more environmental factors, and
generate, using a layout controller implemented at least partly in one or more of configurable logic or fixed-functionality hardware logic using circuit technology, a layer composite comprising a rendering of an augmented realty (AR) environment including information in a layout path based on the one or more of the physical context or the device context, wherein the physical context includes one or more of motion or speed, and
modify, using the layout controller, one or more readability parameters on a level of granularity based on the motion or the speed.

19. The at least one non-transitory computer readable storage medium of claim 18, wherein the instructions, when executed, cause a computing device to:
modify the one or more readability parameters including the layout path, font size, color, shape or opacity of the information rendered in the layer composite to improve readability of the information, wherein the level of granularity is a half-pixel.

20. The at least one non-transitory computer readable storage medium of claim 18, wherein the information is rendered onto one or more objects or surfaces rendered in the layer composite to improve readability of the information rendered in the layer composite.

21. The at least one non-transitory computer readable storage medium of claim 20, wherein the device context to be identified from the one or more environmental factors is to include one or more of a gaze of a user, a gesture of the user or orientation of the one or more sensors.

22. The at least one non-transitory computer readable storage medium of claim 21, wherein the physical context to be identified from the one or more environmental factors is to further include one or more of distance of the user to the one or more objects, distance of the user to one or more surfaces or locations, temperature, lighting, surface colors, surface textures, non-visual information or sound.

23. The at least one non-transitory computer readable storage medium of claim 18, wherein the layer composite includes user controls to use to view the layer composite.

24. The at least one non-transitory computer readable storage medium of claim 18, wherein the instructions, when executed, cause a computing device to receive the information from a content platform, wherein the content platform is to be a web browser, and wherein the information is to identify one or more of root layer information, scroll block layer information or text block layer information for the web browser.

25. The at least one non-transitory computer readable storage medium of claim 24, wherein the layer composite is to include a rendering of one or more of the root layer information, the scroll block layer information or the text block layer information, and the AR environment.

* * * * *